United States Patent
Suzuki et al.

(10) Patent No.: US 9,522,847 B2
(45) Date of Patent: Dec. 20, 2016

(54) DIELECTRIC CERAMIC, LAMINATED CERAMIC ELECTRONIC COMPONENT, LAMINATED CERAMIC CAPACITOR, AND METHOD FOR PRODUCING LAMINATED CERAMIC CAPACITOR

(71) Applicant: MURATA MANUFACTURING CO., LTD., Nagaokakyo-Shi (JP)

(72) Inventors: Shoichiro Suzuki, Kyoto-Fu (JP); Shinichi Yamaguchi, Kyoto-Fu (JP)

(73) Assignee: MURATA MANUFACTURING CO., LTD., Nagaokakyo-Shi, Kyoto-Fu (JP)

(*) Notice: Subject to any disclaimer, the term of this patent is extended or adjusted under 35 U.S.C. 154(b) by 199 days.

(21) Appl. No.: 14/067,591

(22) Filed: Oct. 30, 2013

(65) Prior Publication Data
US 2014/0049877 A1  Feb. 20, 2014

Related U.S. Application Data

(63) Continuation of application No. PCT/JP2012/070346, filed on Aug. 9, 2012.

(30) Foreign Application Priority Data

Aug. 11, 2011  (JP) ................. 2011-175750

(51) Int. Cl.
| | |
|---|---|
| H01G 4/12 | (2006.01) |
| C04B 35/468 | (2006.01) |
| B82Y 30/00 | (2011.01) |

(52) U.S. Cl.
CPC ............ C04B 35/4682 (2013.01); B82Y 30/00 (2013.01); H01G 4/1227 (2013.01);
(Continued)

(58) Field of Classification Search
CPC .. H01G 4/1227; H01G 4/1245; C04B 35/4682
See application file for complete search history.

(56) References Cited

U.S. PATENT DOCUMENTS

| | | |
|---|---|---|
| 4,988,468 A | 1/1991 | Nishioka et al. |
| 5,757,610 A | 5/1998 | Wada et al. |
| (Continued) | | |

FOREIGN PATENT DOCUMENTS

| | | |
|---|---|---|
| CN | 1375835 A | 10/2002 |
| CN | 101104558 A | 1/2008 |
| (Continued) | | |

OTHER PUBLICATIONS

Japanese Office Action issued for counterpart application JP 2013-528065, date of mailing Jan. 13, 2015 (English translation attached).
(Continued)

Primary Examiner — Karl Group
(74) Attorney, Agent, or Firm — Arent Fox LLP

(57) ABSTRACT

There are provided a dielectric ceramic having large specific resistance and even capacitance characteristic at 150° C., as well as a laminated ceramic electronic component employing such a dielectric ceramic. A ceramic layer includes crystal grains, the ceramic layer containing a perovskite type compound containing Ba, Ca, Ti, and Zr, containing Si, and optionally containing Mn. When the total content of Ti and Zr is 1 molar part, the content of Mn is 0.015 molar part or less, the content of Si is 0.005 molar part or more and less than 0.03 molar part, the molar ratio x of Ca/(Ba+Ca) satisfies $0.05 < x < 0.20$, and the molar ratio y of Zr/(Ti+Zr) satisfies $0.03 < y < 0.18$. The crystal grains have an average grain size of less than 130 nm.

5 Claims, 2 Drawing Sheets

(52) U.S. Cl.
CPC ... *H01G 4/1245* (2013.01); *C04B 2235/3208* (2013.01); *C04B 2235/3244* (2013.01); *C04B 2235/3262* (2013.01); *C04B 2235/3418* (2013.01); *C04B 2235/781* (2013.01); *C04B 2235/785* (2013.01); *Y10T 29/435* (2015.01)

(56) References Cited

U.S. PATENT DOCUMENTS

| | | | |
|---|---|---|---|
| 6,939,822 B2 | 9/2005 | Konaka et al. | |
| 7,176,156 B2 * | 2/2007 | Umeda et al. | 501/138 |
| 7,718,560 B2 | 5/2010 | Yanagida et al. | |
| 8,097,551 B2 * | 1/2012 | Kamigaki et al. | 501/139 |
| 8,107,219 B2 * | 1/2012 | Yamaguchi et al. | 361/321.2 |
| 2006/0046921 A1 | 3/2006 | Ito et al. | |
| 2009/0207556 A1 * | 8/2009 | Kamigaki et al. | 361/321.5 |
| 2010/0046140 A1 * | 2/2010 | Yamaguchi et al. | 361/321.4 |
| 2010/0195265 A1 * | 8/2010 | Nakamura et al. | 361/321.4 |
| 2012/0147518 A1 * | 6/2012 | Matsuda et al. | 361/301.4 |
| 2013/0141838 A1 * | 6/2013 | Fukuda et al. | 361/321.4 |

FOREIGN PATENT DOCUMENTS

| | | |
|---|---|---|
| JP | 63-170803 A | 7/1988 |
| JP | S63-1070803 A | 7/1988 |
| JP | 09-241075 | 9/1997 |
| JP | 2003-040671 A | 2/2003 |
| JP | 2004-345927 A | 12/2004 |
| JP | 2005-022890 A | 1/2005 |
| JP | 2006-62939 | 3/2006 |

OTHER PUBLICATIONS

PCT/JP2012/070346, International Search Report, date of mailing Nov. 13, 2012.
PCT/JP2012/070346, Written Opinion of International Searching Authority, date of mailing Nov. 13, 2012.

* cited by examiner

DIELECTRIC CERAMIC, LAMINATED CERAMIC ELECTRONIC COMPONENT, LAMINATED CERAMIC CAPACITOR, AND METHOD FOR PRODUCING LAMINATED CERAMIC CAPACITOR

This is a continuation of application Serial No. PCT/JP2012/070346, filed Aug. 9, 2012, the entire contents of which are incorporated herein by reference.

TECHNICAL FIELD

The present invention relates to a dielectric ceramic used for a laminated ceramic electronic component such as a laminated ceramic capacitor. The present invention also relates to a laminated ceramic electronic component, a laminated ceramic capacitor, and a method for producing the laminated ceramic capacitor.

BACKGROUND ART

Referring to FIG. 1, the following first describes a laminated ceramic capacitor 1, which is a representative example of a laminated ceramic electronic component according to the present invention.

Laminated ceramic capacitor 1 includes a laminate 2 including a plurality of laminated ceramic layers 3 and a plurality of internal electrodes 4 and 5 formed along interfaces between ceramic layers 3.

A first external electrode 8 and a second external electrode 9 are formed at different locations on an external surface of laminate 2. In laminated ceramic capacitor 1 shown in FIG. 1, first external electrode 8 and second external electrode 9 are respectively formed on opposite end surfaces 6 and 7 of laminate 2. The internal electrodes 4 and 5 are arranged such that the plurality of first internal electrodes 4 are electrically connected to first external electrode 8 and the plurality of second internal electrodes 5 are electrically connected to second external electrode 9. These first internal electrodes 4 and second internal electrodes 5 are disposed alternately in the lamination direction. On the surfaces of external electrodes 8 and 9, first metal plating layers 10, 11, and second metal plating layers 12, 13 are formed as required. For internal electrodes 4 and 5, a base metal such as Ni is used for the purpose of cost reduction.

As a dielectric ceramic used for ceramic layer 3, various dielectric ceramics can be selected in accordance with required characteristics, such as permittivity. For example, a dielectric ceramic described in Patent Document 1 is known.

This dielectric ceramic is a sintered body containing at least two types of perovskite type barium calcium titanate zirconate crystal grains (BCTZ type crystal grains) in which a part of A site is substituted by Ca and a part of B site is substituted by Zr. One of the two types of the BCTZ type crystal grains is BCTZ type crystal grain (1) expressed as $[(Ba_{1-x}Ca_x)_m(Ti_{1-y}Zr_y)O_3]$, where $0.15 \leq x \leq 0.25$, $0.15 \leq y < 0.20$, and $1.000 < m$. The other one is BCTZ type crystal grain (2) expressed as $[(Ba_{1-z}Ca_z)_n(Ti_{1-s}Zr_s)O_3]$, where $0 \leq z \leq 0.08$, $0.01 \leq s \leq 0.10$, and $1.000 < n$. Each of BCTZ type crystal grain (1) and BCTZ type crystal grain (2) is characterized by having an average grain size of 0.15 to 0.7 µm.

CITATION LIST

Patent Document

PTD 1: Japanese Patent Laying-Open No. 2005-22890

SUMMARY OF INVENTION

Technical Problem

In recent years, a capacitor having an even capacitance characteristic in a temperature range of −55° C. to 150° C. has been required, particularly for automobiles. However, at 150° C., the dielectric ceramic described in Patent Document 1 disadvantageously has a small specific resistance and has a large temperature coefficient of capacitance characteristic.

The present invention has been made in view of the foregoing problem, and has an object to provide a dielectric ceramic having large specific resistance and an even capacitance characteristic at 150° C., as well as a laminated ceramic electronic component employing such a dielectric ceramic.

Solution to Problem

A dielectric ceramic according to the present invention includes crystal grains of a dielectric ceramic containing a perovskite type compound having Ba, Ca, Ti, and Zr, containing Si, and optionally containing Mn, in which when the total content of Ti and Zr is 1 molar part, the content of Mn is 0.015 molar part or less, the content of Si is 0.005 molar part or more and less than 0.03 molar part, the molar ratio x of Ca/(Ba+Ca) is $0.05<x<0.20$, the molar ratio y of Zr/(Ti+Zr) is $0.03<y<0.18$, and the crystal grains have an average grain size of less than 130 nm.

Preferably, the average grain size of the crystal grains is more than 50 nm and less than 130 nm in the dielectric ceramic according to the present invention.

Further, the present invention is also directed to a laminated ceramic electronic component comprising: a laminate including a laminated plurality of ceramic layers, and a plurality of internal electrodes formed along interfaces between the ceramic layers; and an external electrode formed on an external surface of the laminate, each of the ceramic layers containing the above-described dielectric ceramic.

Further, a laminated ceramic capacitor according to the present invention includes: a laminate including a laminated plurality of dielectric ceramic layers and having crystal grains, and a plurality of internal electrodes formed along interfaces between the dielectric ceramic layers; and a plurality of external electrodes formed on an external surface of the laminate and electrically connected to the internal electrodes, the laminate containing a perovskite type compound containing Ba, Ca, Ti, and Zr, containing Si, and optionally containing Mn, in which when the total content of Ti and Zr is 1 molar part, the content of Mn is 0.015 molar part or less, the content of Si is 0.005 molar part or more and less than 0.03 molar part, the molar ratio x of Ca/(Ba+Ca) is $0.05<x<0.20$, the molar ratio y of Zr/(Ti+Zr) is $0.03<y<0.18$, and the crystal grains have an average grain size of less than 130 nm.

Further, another laminated ceramic capacitor according to the present invention includes: a laminate including a laminated plurality of dielectric ceramic layers and having crystal grains, and a plurality of internal electrodes formed along interfaces between the dielectric ceramic layers; and a plurality of external electrodes formed on an external surface of the laminate and electrically connected to the internal electrodes, the laminate containing a perovskite type compound including Ba, Ca, Ti, and Zr, containing Si, and optionally containing Mn, when the total content of Ti and Zr is 1 molar part with the laminate being dissolved using a solvent, the content of Mn is 0.015 molar part or less, the content of Si is 0.005 molar part or more and less than 0.03 molar part, the molar ratio x of Ca/(Ba+Ca) is 0.05<x<0.20, the molar ratio y of Zr/(Ti+Zr) is 0.03<y<0.18, and the crystal grains having an average grain size of less than 130 nm.

Preferably, the average grain size of the crystal grains is more than 50 nm and less than 130 nm in the laminated ceramic capacitor according to the present invention.

Further, a method for producing a laminated ceramic capacitor according to the present invention includes the steps of: mixing powders, a Si compound, and a Mn compound with one another and thereafter obtaining a ceramic slurry, the powders containing a perovskite type compound including Ba, Ca, Ti, and Zr; obtaining a ceramic green sheet from the ceramic slurry; obtaining a yet-to-be-fired laminate by laminating the ceramic green sheet and a conductive pattern on each other, the conductive pattern being to serve as an internal electrode after being fired; and firing the yet-to-be-tired laminate to obtain a laminate having the internal electrode formed between dielectric ceramic layers having crystal grains, the crystal grains having an average grain size of less than 130 nm, and when the total content of Ti and Zr is 1 molar part in the ceramic slurry, the content of Mn is 0.015 molar part or less, the content of Si is 0.005 molar part or more and less than 0.03 molar part, the molar ratio x of Ca/(Ba+Ca) satisfies 0.05<x<0.20, and the molar ratio y of Zr/(Ti+Zr) satisfies 0.03<y<0.18.

Another method for producing a laminated ceramic capacitor according to the present invention includes the steps of: obtaining a ceramic slurry by measuring and mixing powders, a Si compound, and a Mn compound and forming a resulting mixture into a slurry, the powders containing a perovskite type compound containing Ba, Ca, Ti, and Zr; obtaining a ceramic green sheet from the ceramic slurry; obtaining a yet-to-be-fired laminate by laminating the ceramic green sheet and a conductive pattern on each other, the conductive pattern being to serve as an internal electrode after being fired; and firing the yet-to-be-fired laminate to obtain a laminate having the internal electrode formed between dielectric ceramic layers having crystal grains, the crystal grains having an average grain size of less than 130 nm, and when the total content of Ti and Zr is 1 molar part in the mixture, the content of Mn is 0.015 molar part or less, the content of Si is 0.005 molar part or more and less than 0.03 molar part, the molar ratio x of Ca/(Ba+Ca) is 0.05<x<0.20, and the molar ratio y of Zr/(Ti+Zr) is 0.03<y<0.18.

Preferably, the average grain size of the crystal grains is more than 50 nm and less than 130 nm in the method for producing the laminated ceramic capacitor according to the present invention.

Advantageous Effects of Invention

According to the present invention, there can be provided a dielectric ceramic having large specific resistance and an even capacitance characteristic at 150° C., thus greatly contributing to providing a laminated ceramic capacitor with high performance.

DESCRIPTION OF EMBODIMENTS

Figure 1:
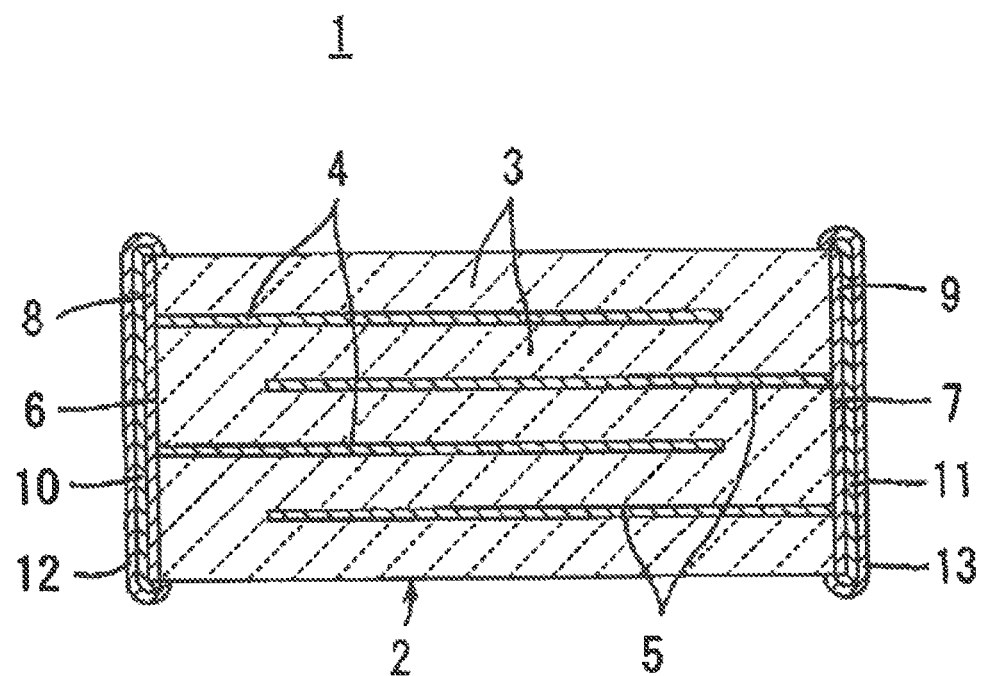
FIG. 1 is a schematic view showing one exemplary laminated ceramic capacitor of the present invention.

A dielectric ceramic of the present invention includes crystal grains, and the dielectric ceramic containing a perovskite type compound including Ba, Ca, Ti, and Zr, containing Si, and optionally containing Mn, in which when the total content of Ti and Zr is 1 molar part, the content of Mn is 0.015 molar part or less, the content of Si is 0.005 molar part or more and less than 0.03 molar part, the molar ratio x of Ca/(Ba+Ca) is 0.05<x<0.20, the molar ratio y of Zr/(Ti+Zr) is 0.03<y<0.18, and the crystal grains having an average grain size of less than 130 nm. With this combination, there can be obtained a dielectric ceramic having large specific resistance and even capacitance characteristic at 150° C.

The reason for this result is not evident but is presumed as follows. In the present invention, the dielectric ceramic contains not only Ba and Ti but also both Ca and Zr. When a barium titanate based ceramic contains Zr but does not contain Ca, the specific resistance thereof becomes large at 150° C., but the phase transition temperature of the dielectric ceramic is decreased. This results in a large temperature coefficient of capacitance characteristic at 150° C. Meanwhile, when the dielectric ceramic contains both Ca and Zr and includes crystal grains with an average grain size of less than 130 nm as in the present invention, the lattice strain becomes large, thereby suppressing decrease of the phase transition temperature of the dielectric ceramic. Accordingly, there can be obtained a dielectric ceramic having large specific resistance and even capacitance characteristic even at a high temperature such as 150° C.

It should be noted that Mn and Si may be present in any form. For example, each of Mn and Si may be present in a grain boundary as an oxide, may form a composite compound with other elements, or may be solved in a crystal grain containing $(Ba_{1-x}Ca_x)(Ti_{1-y}Zr_y)O_3$ as a main component.

Further, the dielectric ceramic of the present invention may contain a rare earth element, Mg, V, Al, Ni, Co, Zn, or the like, unless the object of the present invention is not realized.

The following describes one exemplary method for producing ceramic material powders for forming a ceramic layer.

First, powders of oxide or carbonate of Ba, Ca, Ti, Zr, and the like are prepared as a starting material for the main component. These powders of the starting material are measured, and are mixed and pulverized in a liquid medium. They are dried, and then the resulting mixed powders are thermally treated, thereby obtaining barium titanate powders serving as the main component. This method is generally called "solid phase synthesis method", hut other methods such as a wet type synthesis method can be employed, Examples of the wet type synthesis method include a hydrothermal synthesis method, a hydrolysis method, an oxalic acid method, and the like.

Next, a predetermined amount of MnO powders and a predetermined amount of $SiO_2$ powders are added to the main component powders, The MnO powders and $SiO_2$ powders may he replaced with powders other than oxide powders, unless the object of the present invention is not achieved, Then, they are mixed in a liquid and then dried, thereby obtaining ceramic material powders serving as a final material.

The following illustrates a laminated ceramic capacitor with regard to a method for producing a laminated ceramic electronic component in the present invention.

First, the ceramic material powders are prepared. The ceramic material powders are mixed with an organic binder component in a solvent as required, so as to obtain a ceramic slurry. The ceramic slurry is formed into a sheet, thereby obtaining a ceramic green sheet.

Next, an internal electrode containing Ni as a main component is formed on the ceramic green sheet. There are several methods which can be used to form it. A simple method is to screen-print a conductive paste, which contains Ni powders and an organic vehicle, into a desired pattern. Another method is to transfer a Ni metal foil. Still another method is to form a Ni film while masking in accordance with a vacuum thin film forming method.

Thus, a plurality of such ceramic green sheets and internal electrodes are laminated on, pressed against, and bonded with one another, thereby obtaining a raw, yet-to-be-fired ("green") laminate.

This raw laminate is fired in a firing furnace under predetermined atmosphere and temperature. On this occasion, the internal electrode and the ceramic layer can be co-fired by lowering the oxygen partial pressure in the firing furnace in the case where the main component of each internal electrode is Ni.

Further, when the temperature is increased to the top temperature at a rate of 100° C./minute or more in the firing step, there can be obtained a ceramic layer having crystal grains with a small average grain size while securing sufficient characteristic.

Next, external electrodes are formed at this laminate's portions where the internal electrodes are exposed, thereby completing the laminated ceramic capacitor. Examples of a method for forming the external electrodes includes a method for applying a paste containing metal particles such as Cu or Ag and glass frit, and burning it. Further, metal plating layers such as Ni or Sn are formed on the surface of each external electrode as required.

It should be noted that the laminated ceramic electronic component of the present invention is not limited to the laminated ceramic capacitor, and can be applied to various electronic components such as a ceramic multilayer substrate.

EXPERIMENT EXAMPLE

First, powders of $BaCO_3$, $CaCO_3$, $TiO_2$, and $ZrO_2$ were prepared as a starting material. They were measured such that the total content of Ba and Ca is 1 molar part relative to a total content of Ti and Zr that is 1 molar part, such that the molar ratio of Ca to the total of Ca and Ba, i.e., $Ca/(Ba+Ca)$, is x, and such that the molar ratio of Zr to the total of Zr and Ti, i.e., $Zr/(Ti+Zr)$, is y. Thereafter, the powders were mixed in water using a ball mill for 24 hours. After the mixing, drying was performed and the blended powders were thermally treated for a predetermined time at a predetermined temperature for the purpose of synthesis.

In this way, barium titanate-based main component powders were obtained.

Table 1 shows values of x and y in each sample.

Next, as sub-components, MnO powders and $SiO_2$ powders were prepared. These powders were measured such that the content of Mn is a molar part relative to the total content of Ti and Zr, which was molar part, in the main component powders, and such that the content of Si is b molar part relative to the total content of Ti and Zr in the main component powders. Then, the WO powders and $SiO_2$ powders were added to the main component powders. They were mixed in water using a ball mill for 24 hours, and then were dried, thereby obtaining ceramic material powders. The ceramic material powders were sieved to remove minute powders of 30 nm or less. As a result, the ceramic material powders have an average particle diameter (D50) of 50 nm.

It should be noted that zirconia may be introduced from a source other than the measured materials as in the case where a YSZ (yttria stabilized zirconia) ball is used in the mixing step. In such a case, the blending ratio of the materials is adjusted with the introduced amount being included, so as to obtain compositions of Tables 1A, 1B.

The ceramic material powders were dispersed in an organic solvent containing ethanol and toluene, and a polyvinyl butyral based organic binder was added and the resulting combination mixed, thereby obtaining a ceramic slurry. The ceramic slurry was formed into sheets, thereby obtaining ceramic green sheets.

It should be noted that when the material powders in the ceramic slurry thus prepared were dissolved using an acid and ICP emission spectral analysis was performed, it was confirmed that the powders had substantially the same compositions as those shown in Table 1.

Next, a conductive paste mainly containing Ni was printed onto each of the ceramic green sheets, thereby forming a conductive paste film for forming an internal electrode.

Then, the plurality of ceramic green sheets were laminated on one another such that their sides to which the conductive paste films were drawn (i.e., reached) were disposed alternately, thereby obtaining a laminate. This laminate was heated in a nitrogen atmosphere at a temperature of 350° C. so as to burn off the binder. Thereafter, the laminate was fired in a reduction atmosphere including $H_2$—$N_2$—$H_2O$ gas with an oxygen partial pressure of $10^{-10}$ to $10^{-12}$ MPa for 5 to 30 minutes with the temperature being increased to the temperature shown in Table 1 at a rate of 100° C./minute.

Next, a silver paste containing $B_2O_3$—$SiO_2$—BaO based glass frit was applied onto the both end surfaces of the laminate thus fired, and was burned therein in a nitrogen atmosphere at a temperature of 600° C., thereby thrilling external electrodes electrically connected to the internal electrodes.

The laminated ceramic capacitor produced as described above had external dimensions as follows: length was 2.0 mm, width was 1.0 mm, and thickness was 1.0 mm. Moreover, each of the ceramic layers interposed between the internal electrodes had a thickness of 2.5 μm. The effective number of the layers was five, Further, the area of overlapping of the internal electrodes was $1.7 \times 10^{-6}$ $m^2$.

From the samples (laminated ceramic capacitors) produced, the external electrodes were removed, and then the laminates were dissolved using an acid, and ICP emission spectral analysis was performed. As a result, it was confirmed that the compositions thereof were substantially the same as those shown in Table 1 except for Ni, which was the component of the internal electrodes.

The average grain size of the crystal grains under each condition was calculated in the following manner.

Each of the samples (laminated ceramic capacitors) was cut so as to expose a WT cross section at a depth of approximately ½ of the length (L) direction of the sample. Next, the sample was thermally treated so as to clarify the boundary (grain boundary) among the crystal grains of the dielectric ceramic layers. The thermal treatment was performed at a temperature at which the grains were not grown and the grain boundary was clarified. In this experiment example, the thermal treatment was performed at 1000° C.

Figure 2:
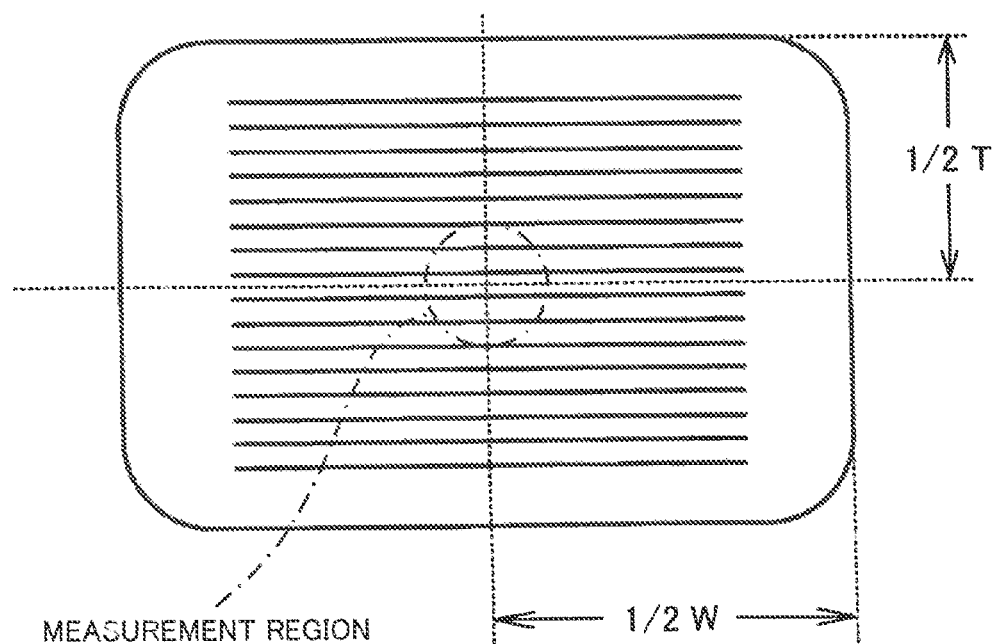
FIG. 2 is an explanatory diagram showing a method for measuring an average grain size of crystal grains.

Further, a scanning electron microscope (SEM) was employed to observe a measurement region in the above-described cut surface (WT cross section) of the laminate at a magnification of 10,000. The measurement region was positioned around a location of approximately ½ of the W and T directions (i.e., substantially the central region of the cut surface) as shown in FIG. 2.

From the obtained SEM image, 50 crystal grains were sampled at random, and image analysis was performed to find an area of each crystal grain's portion inwardly of the grain boundary so as to calculate an equivalent circle diameter, which was regarded as the grain size of the crystal grain. For each condition, two samples were subjected to the measurement of the grain size of each crystal grain (the number of data points: 50 crystal grains×2 (the number of samples)=100 data points).

Assuming that the shape of each of the crystal grains was a sphere having a diameter corresponding to the grain size calculated as described above, the volume of each crystal grain was calculated by calculating the volume of the sphere. From the grain size and volume calculated as described above, the volume average grain size in the samples for each condition was calculated and was regarded as the average grain size for the condition.

Further, the permittivity of each of the obtained samples and the temperature coefficient of permittivity thereof at 150° C. were measured. For the measurement, an automatic bridge type measuring device was used. Further, the measurement was performed under the condition of an AC voltage of 1V with 1 kHz. The permittivity at 25° C. and the permittivity at 150° C. were measured. With the permittivity at 25° C. being regarded as a reference, the temperature coefficient of permittivity at 150° C. was calculated. Thereafter, DC voltage of 25V was applied thereto at 150° C. for 120 seconds, and the specific resistance at 150° C. was calculated. Table 1 shows the results thereof.

TABLE 1

| Sample No. | x | y | a | b | Firing Temperature (° C.) | Average Grain Size (nm) | 150° C. log$\rho$ ($\rho$: $\Omega$m) | $\epsilon r$ | 150° C. TCC (%) | X8R Determination |
|---|---|---|---|---|---|---|---|---|---|---|
| 1* | 0.05 | 0.10 | 0.01 | 0.01 | 1250 | 110 | 8.4 | 1020 | −19 | Not Satisfied |
| 2 | 0.06 | 0.10 | 0.01 | 0.01 | 1250 | 50 | 8.9 | 560 | −7.6 | Satisfied |
| 3 | 0.06 | 0.10 | 0.01 | 0.01 | 1250 | 60 | 8.8 | 650 | −12.2 | Satisfied |
| 4 | 0.06 | 0.10 | 0.01 | 0.01 | 1250 | 70 | 8.7 | 720 | −13.6 | Satisfied |
| 5 | 0.06 | 0.10 | 0.01 | 0.01 | 1250 | 80 | 8.7 | 890 | −14.2 | Satisfied |
| 6 | 0.06 | 0.10 | 0.01 | 0.01 | 1250 | 120 | 8.6 | 990 | −15 | Satisfied |
| 7* | 0.06 | 0.10 | 0.01 | 0.01 | 1250 | 130 | 8.6 | 1100 | −16.6 | Not Satisfied |
| 8 | 0.10 | 0.10 | 0.01 | 0.01 | 1250 | 50 | 8.6 | 540 | −6.9 | Satisfied |
| 9 | 0.10 | 0.10 | 0.01 | 0.01 | 1250 | 60 | 8.6 | 620 | −10.1 | Satisfied |
| 8 | 0.10 | 0.10 | 0.01 | 0.01 | 1250 | 75 | 8.6 | 860 | −11.6 | Satisfied |
| 9 | 0.10 | 0.10 | 0.01 | 0.01 | 1250 | 110 | 8.6 | 950 | −14.3 | Satisfied |
| 10* | 0.10 | 0.10 | 0.01 | 0.01 | 1250 | 130 | 8.6 | 990 | −15.2 | Not Satisfied |
| 11 | 0.18 | 0.10 | 0.01 | 0.01 | 1250 | 50 | 8.2 | 520 | −6.8 | Satisfied |
| 12 | 0.18 | 0.10 | 0.01 | 0.01 | 1250 | 70 | 8.2 | 600 | −7.6 | Satisfied |
| 13 | 0.18 | 0.10 | 0.01 | 0.01 | 1250 | 100 | 8.2 | 630 | −8.8 | Satisfied |
| 14 | 0.18 | 0.10 | 0.01 | 0.01 | 1250 | 110 | 8.1 | 660 | −10.9 | Satisfied |
| 15 | 0.18 | 0.10 | 0.01 | 0.01 | 1250 | 120 | 8.1 | 720 | −11.6 | Satisfied |
| 16* | 0.18 | 0.10 | 0.01 | 0.01 | 1250 | 130 | 7.9 | 780 | −13.3 | Satisfied |
| 17* | 0.20 | 0.10 | 0.01 | 0.01 | 1250 | 100 | 7.8 | 680 | −10.4 | Satisfied |
| 18* | 0.10 | 0.03 | 0.01 | 0.01 | 1250 | 110 | 7.6 | 1210 | −10.9 | Satisfied |
| 19 | 0.10 | 0.04 | 0.01 | 0.01 | 1250 | 50 | 8.2 | 550 | −11.2 | Satisfied |
| 20 | 0.10 | 0.04 | 0.01 | 0.01 | 1250 | 70 | 8.1 | 730 | −12.2 | Satisfied |
| 21 | 0.10 | 0.04 | 0.01 | 0.01 | 1250 | 80 | 8.1 | 800 | −13.3 | Satisfied |
| 22 | 0.10 | 0.04 | 0.01 | 0.01 | 1250 | 90 | 8.1 | 880 | −12.2 | Satisfied |
| 23 | 0.10 | 0.04 | 0.01 | 0.01 | 1250 | 120 | 8.0 | 920 | −13.3 | Satisfied |
| 24* | 0.10 | 0.04 | 0.01 | 0.01 | 1250 | 130 | 7.9 | 1020 | −14.5 | Satisfied |
| 25 | 0.10 | 0.17 | 0.01 | 0.01 | 1250 | 50 | 9.0 | 590 | −13.3 | Satisfied |
| 26 | 0.10 | 0.17 | 0.01 | 0.01 | 1200 | 80 | 9.0 | 880 | −14.2 | Satisfied |
| 27 | 0.10 | 0.17 | 0.01 | 0.01 | 1220 | 90 | 8.9 | 920 | −14.6 | Satisfied |
| 28 | 0.10 | 0.17 | 0.01 | 0.01 | 1200 | 100 | 8.9 | 980 | −14.8 | Satisfied |
| 29 | 0.10 | 0.17 | 0.01 | 0.01 | 1220 | 120 | 8.7 | 1000 | −15.0 | Satisfied |
| 30* | 0.10 | 0.17 | 0.01 | 0.01 | 1220 | 130 | 8.7 | 1210 | −18.2 | Not Satisfied |
| 31* | 0.10 | 0.18 | 0.01 | 0.01 | 1240 | 100 | 9.0 | 1330 | −16.1 | Not Satisfied |
| 32* | 0.10 | 0.10 | 0.000 | 0.010 | 1250 | 120 | 6.8 | 1200 | −11.1 | Satisfied |
| 33 | 0.10 | 0.10 | 0.0005 | 0.010 | 1250 | 110 | 8.5 | 990 | −11.6 | Satisfied |
| 34 | 0.10 | 0.10 | 0.012 | 0.010 | 1250 | 110 | 8.2 | 960 | −12.3 | Satisfied |
| 35 | 0.10 | 0.10 | 0.015 | 0.010 | 1250 | 120 | 8.0 | 960 | −14.2 | Satisfied |
| 36 | 0.10 | 0.10 | 0.010 | 0.005 | 1250 | 90 | 8.0 | 740 | −9.6 | Satisfied |
| 37 | 0.10 | 0.10 | 0.010 | 0.020 | 1250 | 100 | 8.4 | 1000 | −14.9 | Satisfied |
| 38* | 0.10 | 0.10 | 0.010 | 0.030 | 1250 | 120 | 8.3 | 1160 | −17.6 | Not Satisfied |

*indicates falling out of the scope of the present invention.

The results in Table 1 show that the specific resistance was $10^8$ $\Omega$ or more at 150° C., the temperature coefficient of permittivity was in the range of ±15% at 150° C., and X8R characteristics were satisfied in the samples, each of which was a dielectric ceramic including crystal grains, the dielectric ceramic containing a perovskite type compound containing Ba, Cu, Ti, and Zr, containing Si, and optionally containing Mn, in which when the total content of Ti and Zr is 1 molar part, the content of Mn is 0.015 molar part or less, the content of Si is 0.005 molar part or more and less than 0.03 molar part, the molar ratio x of Ca/(Ba+Ca) is $0.05<x<0.20$, the molar ratio y of Zr/(Ti+Zr) is $0.03<y<0.18$, and the crystal grains having an average grain size of less than 130 nm.

Further, the permittivity had a high value of 600 or more in the case where the average grain size of the crystal grains was more than 50 nm and less than 130 nm.

REFERENCE SIGNS LIST

1: laminated ceramic capacitor
2: laminate
3: ceramic layer
4, 5: internal electrode
6, 7: end surface
8, 9: external electrode
10, 11: first metal plating layer
12, 13: second metal plating layer

The invention claimed is:

1. A method for producing a laminated ceramic capacitor, comprising
    mixing material powders having Ba, Ca, Ti and Zr;
    thermally treating said material powders to produce a first powder composed of a plurality of particles, each of said plurality of particles being composed of a perovskite compound that includes Ba, Ca, Ti and Zr;
    mixing said first powder with a second powder composed of an Si compound and a third powder composed of a Mn compound;
    providing a ceramic slurry comprising said first powder, said second powder and said third powder;
    obtaining a ceramic green sheet from said ceramic slurry;
    obtaining an unfired laminate by laminating said ceramic green sheet and a conductive pattern on each other, said conductive pattern disposed so as to serve as an internal electrode after being fired; and
    firing said unfired laminate such that a temperature of the firing is increased to a top temperature at a rate of 100° C./minute or more to obtain a laminate having the internal electrode formed between dielectric ceramic layers having crystal grains, wherein
    said crystal grains have an average grain size of less than 130nm,
    when the total content of Ti and Zr is 1 molar part in said ceramic slurry,
        the content of Mn is 0.0005 molar part or more and 0.015 molar part or less,
        the content of Si is 0.005 molar part or more and less than 0.03 molar part,
        the molar ratio x of Ca/(Ba+Ca) is $0.05<x<0.20$, and
        the molar ratio y of Zr/(Ti+Zr) is $0.03<y<0.18$.

2. A method for producing a laminated ceramic capacitor according to claim 1, wherein the average grain size of said crystal grains is more than 50 nm.

3. A method for producing a laminated ceramic capacitor according to claim 2, wherein the content of Mn is 0.01 to 0.012 molar part, the content of Si is 0.01 to 0.02 molar part, $0.06<x<0.18$, and $0.1<y<0.17$.

4. A method for producing a laminated ceramic capacitor according to claim 2, wherein the content of Mn is 0.01 to 0.012 molar part, the content of Si is 0.01 to 0.02 molar part, $0.06<x<0.18$, and $0.1<y<0.17$.

5. A method for producing a laminated ceramic capacitor according to claim 1, wherein the content of Mn is 0.01 to 0.012 molar part, the content of Si is 0.01 to 0.02 molar part, $0.06<x<0.18$, and $0.1<y<0.17$.

* * * * *